(12) United States Patent
Brown et al.

(10) Patent No.: US 7,727,324 B2
(45) Date of Patent: Jun. 1, 2010

(54) COMPOSITIONS COMPRISING KAOLIN HAVING NANOSIZE DIMENSIONS

(75) Inventors: H. Vincent Brown, Sandersville, GA (US); Robert J. Pruett, Milledgeville, GA (US)

(73) Assignee: Imerys Pigments, Inc., Roswell, GA (US)

( * ) Notice: Subject to any disclaimer, the term of this patent is extended or adjusted under 35 U.S.C. 154(b) by 771 days.

(21) Appl. No.: 11/579,166

(22) PCT Filed: Apr. 28, 2005

(86) PCT No.: PCT/US2005/014589
§ 371 (c)(1),
(2), (4) Date: Oct. 31, 2005

(87) PCT Pub. No.: WO2006/076012
PCT Pub. Date: Jul. 20, 2006

(65) Prior Publication Data
US 2007/0221092 A1    Sep. 27, 2007

Related U.S. Application Data

(60) Provisional application No. 60/566,938, filed on May 3, 2004.

(51) Int. Cl.
*C04B 14/04* (2006.01)
(52) U.S. Cl. .................. 106/486; 106/157.71; 106/487; 106/484; 516/110; 162/181.8
(58) Field of Classification Search ........... 516/110; 501/144; 524/447; 106/157.71, 416, 426, 106/468, 486, 487, 484; 162/181.8; 241/24.1, 241/16
See application file for complete search history.

(56) References Cited

U.S. PATENT DOCUMENTS

| | | | |
|---|---|---|---|
| 3,432,030 A * | 3/1969 | Olivier .................... 209/5 |
| 3,450,257 A | 6/1969 | Cundy | |
| 3,709,709 A | 1/1973 | Torok et al. | |
| 3,808,021 A | 4/1974 | Maynard | |
| 4,017,324 A | 4/1977 | Eggers | |
| 4,182,785 A | 1/1980 | Price | |
| 4,227,920 A | 10/1980 | Chapman et al. | |
| 4,279,661 A | 7/1981 | Strauch et al. | |
| 4,334,985 A | 6/1982 | Turner, Jr. | |
| 4,381,948 A | 5/1983 | McConnell et al. | |
| 4,468,317 A | 8/1984 | Turner, Jr. | |
| 4,477,422 A | 10/1984 | Ginn | |
| 4,738,726 A | 4/1988 | Pratt et al. | |
| 5,011,534 A | 4/1991 | Berube et al. | |
| 5,128,606 A | 7/1992 | Gate et al. | |
| 5,169,443 A | 12/1992 | Willis et al. | |
| 5,227,349 A | 7/1993 | Matthews et al. | |
| 5,261,956 A | 11/1993 | Dunaway et al. | |
| 5,411,587 A | 5/1995 | Willis et al. | |
| 5,522,924 A | 6/1996 | Smith et al. | |
| 5,576,617 A | 11/1996 | Webb et al. | |
| 5,593,490 A | 1/1997 | Etheridge, Jr. et al. | |
| 5,624,488 A | 4/1997 | Forbus et al. | |
| 5,685,900 A | 11/1997 | Yuan et al. | |
| 5,840,113 A | 11/1998 | Freeman et al. | |
| 5,882,396 A | 3/1999 | Hiorns | |
| 5,968,250 A | 10/1999 | Sheppard, Jr. et al. | |
| 6,007,618 A | 12/1999 | Norris et al. | |
| 6,197,105 B1 | 3/2001 | Freeman et al. | |
| 6,235,107 B1 | 5/2001 | Yuan | |
| 6,312,511 B1 | 11/2001 | Bilimoria et al. | |
| 6,378,703 B1 | 4/2002 | Mathur et al. | |
| 6,379,452 B1 | 4/2002 | Maxwell et al. | |
| 6,402,826 B1 | 6/2002 | Yuan et al. | |
| 6,478,865 B1 | 11/2002 | Malla et al. | |
| 6,564,199 B1 | 5/2003 | Pruett et al. | |
| 6,585,822 B2 | 7/2003 | Berube et al. | |

(Continued)

FOREIGN PATENT DOCUMENTS

| | | |
|---|---|---|
| EP | 0 528 078 B1 | 2/1993 |
| GB | 2 240 398 A | 7/1991 |
| WO | WO 00/32699 | 6/2000 |
| WO | WO 00/66510 | 11/2000 |
| WO | WO 03/093577 A1 | 11/2003 |

OTHER PUBLICATIONS

Office Action dated Apr. 15, 2008, from co-pending U.S. Appl. No. 11/349,217.

(Continued)

*Primary Examiner*—Jerry Lorengo
*Assistant Examiner*—Carlos Barcena
(74) *Attorney, Agent, or Firm*—Finnegan, Henderson, Farabow, Garrett & Dunner, L.L.P.

(57) ABSTRACT

Disclosed herein is a kaolin composition having nanosize dimensions. At least about 75% of the kaolin particles by weight have an equivalent spherical diameter (esd) of less than about 0.25 μm. The kaolin can also have a particle size distribution wherein at least about 99% of the particles by weight have an esd of less than about 2 μm, and/or wherein at least about 98% of the particles by weight have an esd of less than about 1 μm, and/or wherein at least about 97% of the particles by weight have an esd of less than about 0.5 μm. The kaolin can have a mean diameter ranging from about 0.075 μm to about 0.2 μm, and a shape factor of about 30 or less.

15 Claims, No Drawings

U.S. PATENT DOCUMENTS

| | | |
|---|---|---|
| 6,615,987 B1 | 9/2003 | Greenhill et al. |
| 6,660,076 B2 | 12/2003 | Valadares et al. |
| 6,808,559 B2 | 10/2004 | Golley et al. |
| 7,122,080 B2 | 10/2006 | Pruett et al. |
| 2002/0117085 A1 | 8/2002 | Wesley |
| 2002/0129741 A1 | 9/2002 | Berube et al. |
| 2003/0085012 A1 | 5/2003 | Jones et al. |
| 2003/0094120 A1 | 5/2003 | Golley et al. |
| 2003/0141224 A1 | 7/2003 | Pruett et al. |
| 2003/0177952 A1 | 9/2003 | Cummings et al. |
| 2006/0047047 A1 | 3/2006 | Patel et al. |
| 2006/0086289 A1 | 4/2006 | Mathur et al. |
| 2006/0185557 A1 | 8/2006 | Garska et al. |
| 2006/0249051 A1 | 11/2006 | Pruett et al. |
| 2006/0249270 A1 | 11/2006 | Alves et al. |
| 2007/0221092 A1 | 9/2007 | Brown et al. |

OTHER PUBLICATIONS

Office Action Jul. 23, 2007, from co-pending U.S. Appl. No. 11/349,217.

Office Action dated Feb. 13, 2007, from co-pending U.S. Appl. No. 11/349,217.

Office Action dated Feb. 19, 2008, from co-pending U.S. Appl. No. 11/349,213.

Office Action dated Aug. 7, 2007, from co-pending U.S. Appl. No. 11/349,213.

Office Action dated Mar. 16, 2007, from co-pending U.S. Appl. No. 11/349,213.

Office Action dated Jun. 11, 2008, from co-pending U.S. Appl. No. 11/349,216.

Office Action dated Sep. 24, 2007, from co-pending U.S. Appl. No. 11/349,216.

Office Action dated Mar. 7, 2007, from co-pending U.S. Appl. No. 11/349,216.

Carneiro, B.S; Angélica R.S.; Scheller, T.; de Castro; E.A.S.; and Neves, R.F., "Mineralogical and geochemical characterization of the hard kaolin from the Capim region, Pará, northern Brazil," Cerâmica 49, 2003, pp. 237-244.

Kotschoubey, Basile; Truckenbrodt, Werner and Hieronymus, Bernard, "Deposits of Kaolin and semi-flint clay in northeastern Pará state, Brazil," Revista Brasileira de Geociências, vol. 26 (2), 1996, pp. 71-80.

Office Action dated Oct. 9, 2008, from co-pending U.S. Appl. No. 11/349,217.

Office Action dated Jan. 28, 2009, from co-pending U.S. Appl. No. 11/349,217.

Office Action dated Aug. 25, 20085;, from co-pending U.S. Appl. No. 11/349,213.

Office Action dated Dec. 23, 2008, from co-pending U.S. Appl. No. 11/349,213.

Office Action dated Jun. 30, 2009, from co-pending U.S. Appl. No. 11/349,213.

Office Action dated Dec. 9, 2008, from co-pending U.S. Appl. No. 11/349,216.

Office Action dated Jun. 15, 2009, from co-pending U.S. Appl. No. 11/349,216.

\* cited by examiner

COMPOSITIONS COMPRISING KAOLIN HAVING NANOSIZE DIMENSIONS

This application claims priority to U.S. Provisional Patent Application No. 60/566,938, filed May 3, 2004.

The present invention relates to novel kaolin compositions, such as kaolins having nanosize dimensions, methods for making such compositions, and their uses, such as inks, polymers, and rubbers.

Kaolin is a white industrial mineral, which has found use in a wide range of applications. Large deposits of kaolin clay exist in Devon and Cornwall, England, Brazil, China, Australia and in the states of Georgia and South Carolina, United States of America.

Kaolin clay, also referred to as china clay or hydrous kaolin, contains predominantly mineral kaolinite ($Al_2Si_2O_5(OH)_4$), a hydrous aluminum silicate, together with small concentrations of various other minerals.

Some of these other minerals in kaolin, such as fine ferruginous or titaniferous impurities impart undesirable color to the clay. Additional minerals in kaolin, which fall into a classification of silicates and referred to as phyllosilicates, comprise mica, smectite, vermiculite, hydrobiotite, mixed or layered illite-smectite or mixed layers of other clay minerals. These latter minerals are known to have higher water adsorption capability than kaolinite, and therefore, generally have an undesirable effect on the rheology of high solids kaolin-water suspensions. That is, these minerals can cause the suspensions or slurries to thicken and become more viscous at high and low shear rates. The kaolin industry generally avoids mining clays with micaceous or smectitic minerals. Alternatively, the kaolin industry removes micaceous and smectitic minerals with processes, such as desliming, or the industry blends such clays with relatively pure kaolin ores to reduce the concentration of micaceous and smectitic minerals to a level that does not affect clay-water suspension rheology. Examples of such beneficiation techniques include U.S. Pat. Nos. 4,182,785; 4,334,985; 4,477,422; and 5,593,490, the disclosures of which are incorporated by reference herein.

Kaolinite is a hydrous aluminosilicate that exists in the form of clay-sized crystals in the shape of thin hexagonal plates or in booklets of platelets called "stacks". Kaolinite stacks may be subjected to a grinding action to easily separate or delaminate them into individual plates.

Nanoclays are clays comprised of particles having a median particle size generally smaller than about 100 nanometers. Recently, nanoclays have been found to be useful in a variety of applications.

One approach to the production of nanoclays is to grind larger clay particles until they have been broken up into smaller particles in the nanosize range. However, grinding a typical clay to this extent can consume an excessive amount of energy as high as 1000 kW-hr/ton or more. Such an approach is not likely to be economically feasible for large scale production of nanoclays.

Another approach to the production of nanoclays has been to mine clays that naturally have nanosize characteristics. The most commonly used of the natural nanoclays to date have been smectites.

There remains a need for nanoparticle kaolin compositions, and more facile processes for making such compositions. There also remains a need for kaolins capable of affording at least one of a number of improved physical properties, such as, for example, brightness, opacity, and whiteness.

One aspect of the present invention provides a composition comprising kaolin having a particle size distribution wherein at least about 75% of the particles by weight have an equivalent spherical diameter or "esd" of less than about 0.25 µm. In one aspect, the particle size distribution of a particulate product may be determined by measuring the sedimentation speeds of the dispersed particles of the particulate product under test through a standard dilute aqueous suspension using a SEDIGRAPH™, e.g., SEDIGRAPH 5100, obtained from Micromeritics Corporation, USA. The size of a given particle can be expressed in terms of the diameter of a sphere of equivalent diameter (esd), which sediments through the suspension. The SEDIGRAPH graphically records the percentage by weight of particles having an esd less than a particular esd value, versus that esd value.

In one aspect, at least about 99% of the particles by weight have an esd of less than about 2 µm. In another aspect, at least about 98% of the particles by weight have an esd of less than about 1 µm. In yet another aspect, at least about 97% of the particles by weight have an esd of less than about 0.5 µm. In yet another aspect, at least about 80% of the particles by weight have an esd less than about 0.25 µm, e.g., at least about 85% of the particles by weight have an esd less than about 0.25 µm. In yet another aspect, at least about 50% by weight of the particles have an esd less than about 0.15 µm, such as for example about 65% by weight of particles having an esd less than about 0.15 µm. In yet another aspect, at least about 40% by weight of the particles have an esd less than about 0.1 µm.

"Mean particle diameter" is defined as the diameter of a circle that has the same area as the largest face of the particle. The mean particle size, $d_{50}$ value, and other particle size properties referred to in the present application are measured in a well known manner by sedimentation of the particulate material in a fully dispersed condition in an aqueous medium using a SEDIGRAPH 5100. The mean particle size $d_{50}$ is the value determined in this way of the particle esd at which there are 50% by weight of the particles, which have an esd less than that $d_{50}$ value. In one aspect, the kaolin has a mean diameter ranging from about 0.075 µm to about 0.2 µm, such as a mean diameter ranging from about 0.1 µm to about 0.15 µm.

"Shape factor" as used herein is a measure of an average value (on a weight average basis) of the ratio of mean particle diameter to particle thickness for a population of particles of varying size and shape as measured using the electrical conductivity method and apparatus described in GB-A-2240398/U.S. Pat. No. 5,128,606/EP-A-0528078, which are incorporated herein by reference in their entirety, and using the equations derived in these patent specifications.

In the measurement method described in EP-A-0528078 the electrical conductivity of a fully dispersed aqueous suspension of the particles under test is caused to flow through an elongated tube. Measurements of the electrical conductivity are taken between (a) a pair of electrodes separated from one another along the longitudinal axis of the tube, and (b) a pair of electrodes separated from one another across the transverse width of the tube, and using the difference between the two conductivity measurements, the shape factor of the particulate material under test is determined. In one aspect, the kaolin has a shape factor of about 30 or less. In another aspect, the kaolin has a shape factor ranging from about 15 to about 25. In one aspect, the nanosize kaolin provides desired optical values, such as brightness. In one aspect, the kaolin has a GE brightness of at least about 80, such as a GE brightness of at least about 85, or a GE brightness of at least about 90.

Another aspect provides a composition comprising kaolin having a particle size distribution of:

at least about 99% of the particles by weight have an esd of less than about 2 µm;

at least about 98% of the particles by weight have an esd of less than about 1 μm;

at least about 97% of the particles by weight have an esd of less than about 0.5 μm; and at least about 75% of the particles by weight have an esd of less than about 0.25 μm.

Another aspect provides a method of refining kaolin comprising:

(a) providing a kaolin having a particle size distribution wherein at least about 30% by weight of the kaolin has an esd of less than about 2 μm;

(b) classifying the kaolin to obtain a fine fraction, wherein at least about 75% by weight of the fine fraction has an esd of less than about 0.25 μm.

In one aspect, the kaolin in (a) can be provided as a slurry. For example, a kaolin slurry can be prepared by blunging crude or processed kaolin clay with water to form an aqueous suspension. The kaolin can be dried and re-slurried to a solids content ranging from about 35 to about 40%. The kaolin slurry may optionally contain a dispersing agent for the kaolin.

In one aspect, the kaolin provided in (a) comprises at least about 75% by weight of the kaolin having an esd of less than about 2 μm. In another aspect, the kaolin provided in (a) comprises at least about 70% by weight of the kaolin having an esd of less than about 1 μm. In yet another aspect, the kaolin provided in (a) comprises at least about 50% by weight of the kaolin having an esd of less than about 0.5 μm.

Crude kaolin or a kaolin product obtained from grinding or milling may be refined to remove impurities by using well known procedures generally referred to as beneficiation processes. Beneficiation can also help improve physical properties of the kaolin. In one aspect, the kaolin can be subjected to one or more well known beneficiation steps to remove undesirable impurities, e.g., prior to (b).

In one aspect, the slurry can be subjected to a selective flocculation process in which the impurities are flocced out of suspension while the kaolin clay remains in suspension, prior to (b). In one example, a high molecular weight anionic polymer having a molecular weight in excess of one million, or a molecular weight in the range of about 10 to about 15 million can be used. The anionic polymer can be a copolymer of a polyacrylamide or polyampholyte. The refined clay slurry may be ozoned, leached (bleached), and/or filtered, followed by either redispersing in a makedown tank or alternately spray dried. Details of a particular selective flocculation process can be found in U.S. Pat. No. 4,227,920, to Chapman and Anderson, in U.S. Pat. Nos. 6,235,107 and 6,615,987, and in U.S. Pat. No. 5,685,900 to Yuan et al., which includes ozonation, the disclosures of which are herein incorporated by reference in their entirety.

In one aspect, an aqueous suspension of kaolin clay (a slurry) may be subjected to a froth flotation treatment operation to remove titanium containing impurities in the froth. In one example, the slurry can be conditioned with an oleic acid to coat the air bubbles produced in the float cells. The titania minerals adhere to the air bubbles and are floated out of the kaolin slurry. An example of such a flotation process is described in U.S. Pat. No. 3,450,257, to Cundy, which is herein incorporated by reference. This process can result in an improved brightness in the kaolin pigment, i.e., a brightness gain ranging from about 0.1 to about 3 units.

Other selective separation methods can also be used as known in the art prior to (b).

In one aspect, the kaolin prior to (b) can be subjected to sand grinding, such as a light sand grinding, by using a particulate grinding medium, such as silica sand. The sand grinding medium can have a relatively high specific gravity, for example 2 or more. The medium may for example comprise grains of silica sand having diameters not larger than about 2 μm and not smaller than about 0.25 μm. In one embodiment, the kaolin is subjected to a heavy sand grinding.

The kaolin suspension can be separated from the particulate grinding medium in any manner known in the art, such by passing the suspension through a sieve of appropriate aperture size, for example a sieve having nominal aperture sizes in the range of from about 0.1 mm to about 0.25 mm.

The classifying (or fractionating) step (b) may be accomplished by using any known or after-discovered method. Exemplary methods include gravity sedimentation or elutriation, any type of hydrocyclone apparatus, or, for example, a solid bowl decanter centrifuge, disc nozzle centrifuge, or the like. The resultant coarse fraction may be discarded, used as a separate product or, for example, may be directed back to the blend tank as an auxiliary source for the coarse kaolin used in the methods disclosed herein.

In one aspect, the classifying step can be carried out on a centrifuge, such as a Merco centrifuge, which is a high speed centrifuge. For example, the kaolin suspension can be supplied to the centrifuge and separated into a coarse fraction and a fine fraction. In one aspect, a selected percentage by weight of the fine fraction is removed and used in the compositions disclosed herein. The coarse fraction can be used for other applications.

In one aspect, the kaolin is classified in (b) to a level of at least about 75% finer than 0.25 μm, such as a level of at least about 80% finer than 0.25 μm. In another aspect, the kaolin is classified to at least about 85% finer than 0.25 μm. In another aspect, the fine fraction of (b) comprises at least about 99% by weight of the kaolin having an esd of less than about 2 μm, such as at least about 98% by weight of the kaolin having an esd of less than about 1 μm. In another aspect, the fine fraction of (b) comprises at least about 50% by weight of kaolin having an esd less than about 0.15 μm.

In one aspect, the kaolin slurry may be passed through a high intensity magnetic separator to remove iron containing impurities. One example of magnetic separation is described in U.S. Pat. No. 5,522,924, the disclosure of which is herein incorporated by reference in its entirety. A standard high intensity wet magnetic separator can be used. This process can also result in a brightness gain ranging from about 0.1 to about 3.0 units. The magnetic separation can occur prior to or after (b).

The classified kaolin from (b) may optionally be subjected to a conventional leaching (or bleaching) known to one of ordinary skill in the art. For example, a reductive leaching agent such as sodium hydrosulfite may be added in a dose range of, for example, about 0.5 to 5.0 pounds per ton of kaolin, with certain embodiments containing less than about 4 pounds per ton on a dry basis. Other suitable reductive bleaching agents, such as formamidine sulphinic acid, may also be employed. Reductive bleaching using sodium hydrosulfite can be carried out at an acidic pH, typically in the range of 2.0 to 4.0.

The classified kaolin suspension may be further treated to improve one or more of its properties. For example, high energy liquid working, e.g., using a high speed mixer, may be applied to the product in slurry form, and subsequent redispersion in an aqueous medium, e.g. during makedown of a coating composition.

In one embodiment, the classified kaolin suspension may also optionally be dewatered in one of the ways well known in the art, e.g. filtration, centrifugation, evaporation and the like.

Dewatering can be accomplished with a filter press. A resulting filter cake can be mixed subsequently with a dispersing agent for the kaolin clay and converted into a fluid slurry that can be transported and sold in this form. Alternatively, the kaolin clay may be thermally dried, for example by introducing the fluid slurry of the kaolin clay into a spray drier, such that it may be transported in a substantially dry form.

In one aspect, the composition can comprise a kaolin blend. For example, the kaolin can be blended with other white minerals known in the art such as for example, talc, calcium carbonate, titanium dioxide, gypsum, and the like.

In another aspect the composition can comprise a high purity kaolin having the desired fine particle size distribution (i.e. at least about 75% of the particles by weight have an esd of less than about 0.25 μm). Potassium and magnesium levels can be an indicator of the concentration of mineral impurities, such as smectites in some sedimentary kaolins. Smectite impurities can have an adverse impact on viscosity. Thus, in one aspect the kaolin clay crude used in the invention can be a high purity kaolin comprising no more than about 0.04 percent by weight MgO and no more than about 0.12 percent by weight $K_2O$.

The method in this aspect can further comprise any of the refining steps discussed herein, or that are well known in the art.

The fine fraction from (b) can be provided as a slurry. In one aspect, kaolin slurries having a high solids content are generally desired because the minimized volume of slurry allows for ease of handling and reduction of transport costs. Thus, minimal volumes of such higher density kaolin slurries can be useful in products containing these slurries.

Even further disclosed herein are products using the compositions disclosed herein such as: coatings, e.g. non-aqueous coatings for paper; inks; paints; polymer products; rubber products; and barrier coating compositions.

In one aspect, the present disclosure provides a coating, such as a non-aqueous coating for paper or paperboard, comprising the kaolins disclosed herein. The coating can further comprise at least one binder chosen from binders conventionally used in the art. Exemplary binders include, but are not limited to, adhesives derived from natural starch and synthetic binders, including, for example, styrene butadiene, acrylic latex, vinyl acetate latex, or styrene acrylic, casein, polyvinyl alcohol, polyvinyl acetate, or mixtures thereof.

Paper and paper board coatings may have different binder levels depending on the end use of the coated product. Appropriate binder levels based upon the desired end product would be readily apparent to the skilled artisan. For example, binder levels can be controlled to allow the surfaces to receive ink without disruption. The latex binder levels for paper or paper board coatings generally range from 3% to 30% by weight relative to the total weight of the coating. For example, the at least one binder can be present in an amount ranging from 3% to 30%, such as from 10% to 30%, by weight relative to the total weight of the coating. Paper or paper board coatings can include the kaolins disclosed herein in an amount ranging from about 3% to about 95% by weight on a dry coating basis.

In yet another aspect, the present disclosure provides a coated paper comprising a fibrous substrate and a coating on the substrate comprising a paper coating composition as described above.

In another aspect, the present disclosure provides an ink comprising, in an appropriate medium, the kaolins disclosed herein. The "ink" disclosed herein can be chosen from aqueous inks and non-aqueous inks, including, for example, gravure inks, heat-set inks, lithographic printing inks, and newsprint inks. The kaolins disclosed herein can serve, for example, as a pigment in the ink and can provide economic advantage to the ink product, as they can exhibit high dispersion rate in both aqueous medium and non-aqueous medium.

The appropriate medium in the ink disclosed herein can be chosen from aqueous media and non-aqueous media conventionally used in the art.

Depending on the final applications of the ink, the ink disclosed herein can further comprise at least one component chosen, for example, from resins, such as vinyl resins; polymers; additives, such as rheology modifiers, surfactants, and drying accelerating agents such as sodium lauryl sulfate, N,N-diethyl-m-toluamide, cyclohexylpyrrolidinone and butyl carbitol; fillers; diluents; humectants, such as ethylene glycol, propylene glycol, diethylene glycols, glycerine, dipropylene glycols, polyethylene glycols, polypropylene glycols, amides, ethers, carboxylic acids, esters, alcohols, organosulfides, organosulfoxides, sulfones, alcohol derivatives, carbitol, butyl carbitol, cellosolve, ether derivatives, amino alcohols, and ketones; and biocides, such as benzoates, sorbates, and isothiazolones. The ink product can further comprise at least one additional pigment chosen from those conventionally used in the art.

The amount of kaolin in a given ink can vary based on the formulation of the ink, as would be apparent to one of ordinary skill in the art. For example, in some embodiments the kaolin can comprise from 5%-45% by weight of the ink as formulated.

One aspect provides an ink comprising kaolin having a particle size distribution wherein at least about 75% of the particles by weight have an esd of less than about 0.25 μm.

In another aspect, the present disclosure provides a paint, such as an aqueous or non-aqueous industrial coating, architectural paint, deco paint, or art paint, comprising, in an appropriate medium, the kaolins disclosed herein. The kaolins disclosed herein can serve, for example, as a gloss control agent pigment in the paint. The kaolin can generally be present in an amount less that the critical pigment volume. However, the pigments disclosed herein can also be present in higher pigment volume concentrations, such as for example in the range of 1% to 80% by weight on a dry film basis.

The paint disclosed herein can further comprise at least one component chosen from binders, such as polymeric binders, for example, water dispersible binders chosen, for example, from polyvinyl alcohol (PVA) and latex; and additives conventionally used in paints, chosen, for example, from surfactants, thickeners, biocides, defoamers, wetting agents, dispersants, and coalescents. The paint disclosed herein can comprise at least one additional pigment chosen, for example, from $TiO_2$ and calcium carbonate.

One aspect provides a paint comprising kaolin having a particle size distribution wherein at least about 75% of the particles by weight have an esd of less than about 0.25 μm.

In another aspect, the present disclosure provides a polymer product comprising the kaolins disclosed herein. The kaolin can be present at a concentration of up to 60% by weight of the polymer as compounded and up to 30% by weight of the final polymer article. The kaolin disclosed herein can be used both for resin extension (i.e., filling), $TiO_2$ extension, and reinforcement of the polymer.

The polymer product disclosed herein comprises at least one polymer resin. The term "resin" means a polymeric material, either solid or liquid, prior to shaping into a plastic article. The at least one polymer resin can be one which, on cooling (in the case of thermoplastic plastics) or curing (in the case of thermosetting plastics), can form a plastic material.

The at least one polymer resin, which can be used herein, can be chosen, for example, from polyolefin resins, polyamide resins, polyester resins, engineering polymers, allyl resins, thermoplastic resins, and thermoset resins.

One aspect provides a polymer composition comprising kaolin having a particle size distribution wherein at least about 75% of the particles by weight have an esd of less than about 0.25 μm.

In another aspect, the present disclosure provides a rubber product comprising the kaolins disclosed herein. The products can provide the benefits of resin extension, reinforcement of the rubber, and increased hardness of the rubber composition. The rubber product disclosed herein comprises at least one rubber chosen from natural rubbers and synthetic rubbers. For example, sulphur-vulcanisable rubbers, which can be used for manufacture of tire treads can be used in the products and methods disclosed herein. Examples of the synthetic rubbers, which may be used in the present invention, include, but are not limited to, styrene-butadiene rubber (SBR), vinyl-styrene-butadiene rubber (VSBR), butadiene rubber (BR), and neoprene rubber or polyisoprene. The SBR may be emulsion SBR (E-SBR) or solution SBR(S-SBR). The VSBR may be solution VSBR(S-VSBR). And examples of the BR include, but are not limited to, cis-1,3-polybutadiene rubber and cis-1,4-polybutadiene rubber. An example of the natural rubbers, which can be used in the present invention, is Standard Malaysian natural rubber.

The rubber product disclosed herein may further comprise at least one additive chosen from conventional additives used in the art, for example, extender oils and mineral and synthetic fillers. The rubber can include the inventive kaolin in an amount up to 35% by weight as formulated.

One aspect provides a rubber composition comprising kaolin having a particle size distribution wherein at least about 75% of the particles by weight have an esd of less than about 0.25 μm.

Another aspect provides a method of making a barrier coating from the disclosed fine kaolin having the properties described herein. Barrier coatings are useful to impart to paper resistance to moisture, moisture vapor, grease, oil, air, etc. When making barrier coatings, the amount of binder in the formulation may be very high on the order of 40% to 50%.

Another aspect described herein provides a barrier coating composition, comprising a slurry comprising the inventive kaolin described herein. The solids content of the slurry can range from about 45% to about 70%.

Another aspect provides a barrier coating composition comprising kaolin having a particle size distribution wherein at least about 75% of the particles by weight have an esd of less than about 0.25 μm.

Another aspect described herein provides a method of improving barrier properties in a paper comprising coating a fibrous substrate with a paper coating composition comprising an inventive kaolin as described herein.

The present invention is further illuminated by the following non-limiting examples, which are intended to be purely exemplary of the invention.

EXAMPLE 1

This Example describes the preparation of a nanokaolin composition according to the invention. An East Georgia fine-to-intermediate crude kaolin sample at 68% solids was blunged with 7-8 lbs/ton of sodium hexametaphosphates and 0.5 lbs/ton sodium polyacrylate (C211). The pH of the slurry was adjusted to 9.5 with $NH_4OH$. The properties of the kaolin after blunging are shown in Table I, below, under the column heading "Blunger Product."

TABLE I

| | | Blunger Product | Merco Fine Fraction | Spray Dried Product |
|---|---|---|---|---|
| Brightness | | 84.2 | 92.21 | 91.51 |
| $TiO_2$ | | 1.725 | 0.640 | 0.522 |
| $Fe_2O_3$ | | 1.205 | 1.261 | 1.119 |
| SF | | 24.5 | 18.3 | 23.5 |
| PSD | <2 μm | 81.8 | 99.7 | 99.7 |
| | <1.0 μm | 71.9 | 99.4 | 99.6 |
| | <0.5 μm | 57.9 | 98.5 | 99.0 |
| | <0.25 μm | 35.8 | 86.6 | 86.7 |
| | <0.2 μm | | | 77.5 |
| | <0.15 μm | | | 65.9 |
| | <0.1 μm | | | 49.8 |
| D50 | | | | 0.109 μm |

Selective flocculation was performed on the Blunger Product by using the procedure described in U.S. Pat. Nos. 6,235,107 and 6,615,987. The flocked product was then subjected to ozonation by using the procedure of U.S. Pat. No. 5,685,900.

The classification step was performed with a Merco high speed centrifuge. The fine fraction was collected, and its properties are shown in Table I under the heading "Merco Fine Fraction." The coarse fraction can be used in other products.

The fine fraction was then spray dried. The properties of the spray dried product are shown in Table I, under the heading "Spray Dried."

The spray dried product was then subjected to magnetic separation by using the method described in U.S. Pat. No. 5,522,924, resulting in a brightness increase to 92.44. After magnetic separation, the kaolin was leached, further raising the brightness to 92.98.

EXAMPLE 2

This Example describes the preparation of nanosize kaolin according to the present invention. A sample of kaolin was subjected to the same process steps as described in Example 1 above. Table II shows the properties of the kaolin after each process.

TABLE II

| | | Blunger Product | Merco Fines | Spray Dried Product |
|---|---|---|---|---|
| Brightness | | 83.1 | 92.80 | 92.43 |
| $TiO_2$ | | 1.855 | 0.596 | 0.49 |
| $Fe_2O_3$ | | 1.092 | 0.979 | 0.935 |
| SF | | 13.8 | 16.4 | 15.8 |
| PSD | <2 μm | 82.1 | 99.3 | 99.6 |
| | <1.0 μm | 75.3 | 98.8 | 99.4 |
| | <0.5 μm | 63.2 | 97.3 | 97.5 |
| | <0.25 μm | 39.9 | 78.3 | 78.2 |
| | <0.2 μm | | | 67.0 |
| | <0.15 μm | | | 54.8 |
| | <0.1 μm | | | 40.6 |
| D50 | | | | 0.138 |

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A composition comprising kaolin having a particle size distribution wherein at least about 75% of the particles by weight have an esd of less than about 0.25 μm, and wherein the kaolin has a mean diameter ranging from about 0.1 μm to about 0.15 μm.

2. The composition according to claim 1, wherein the kaolin has a GE brightness of at least about 80.

3. The composition according to claim 2, wherein the kaolin has a GE brightness of at least about 85.

4. The composition according to claim 3, wherein the kaolin has a GE brightness of at least about 90.

5. The composition according to claim 1, wherein the kaolin has a shape factor of about 30 or less.

6. The composition according to claim 5, wherein the kaolin has a shape factor ranging from about 15 to about 25.

7. The composition according to claim 1, wherein at least about 99% of the particles by weight have an esd of less than about 2 μm.

8. The composition according to claim 1, wherein at least about 98% of the particles by weight have an esd of less than about 1 μm.

9. The composition according to claim 1, wherein at least about 97% of the particles by weight have an esd of less than about 0.5 μm.

10. The composition according to claim 1, wherein at least about 80% of the particles by weight have an esd less than about 0.25 μm.

11. The composition according to claim 10, wherein at least about 85% of the particles by weight have an esd less than about 0.25 μm.

12. A composition comprising kaolin having a particle size distribution wherein at least about 75% of the particles by weight have an esd of less than about 0.25 μm, and wherein at least about 50% of the particles by weight have an esd less than about 0.15 μm.

13. The composition according to claim 12, wherein at least about 65% of the particles by weight have an esd less than about 0.15 μm.

14. A composition comprising kaolin having a particle size distribution wherein at least about 75% of the particles by weight have an esd of less than about 0.25 μm, and wherein at least about 40% of the particles by weight have an esd less than about 0.1 μm.

15. A composition comprising kaolin having a particle size distribution of:
- at least about 99% of the particles by weight have an esd of less than about 2 μm;
- at least about 98% of the particles by weight have an esd of less than about 1 μm;
- at least about 97% of the particles by weight have an esd of less than about 0.5 μm; and
- at least about 75% of the particles by weight have an esd of less than about 0.25 μm,
- wherein at least about 50% of the particles by weight have an esd less than about 0.15 μm.

* * * * *

UNITED STATES PATENT AND TRADEMARK OFFICE
CERTIFICATE OF CORRECTION

PATENT NO. : 7,727,324 B2 Page 1 of 1
APPLICATION NO. : 11/579166
DATED : June 1, 2010
INVENTOR(S) : H. Vincent Brown and Robert J. Pruett It is certified that error appears in the above-identified patent and that said Letters Patent is hereby corrected as shown below:

Title page, item 86, "Oct. 31, 2005" should read -- Oct. 31, 2006 --.

Signed and Sealed this

Twenty-fourth Day of August, 2010

David J. Kappos
*Director of the United States Patent and Trademark Office*